United States Patent
Kim

(10) Patent No.: US 8,015,336 B2
(45) Date of Patent: Sep. 6, 2011

(54) METHOD OF COMPENSATING FOR PROPAGATION DELAY OF TRI-STATE BIDIRECTIONAL BUS IN A SEMICONDUCTOR DEVICE

(75) Inventor: Jae-kwan Kim, Seongnam-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 251 days.

(21) Appl. No.: 11/949,176

(22) Filed: Dec. 3, 2007

(65) Prior Publication Data

US 2008/0168200 A1 Jul. 10, 2008

(30) Foreign Application Priority Data

Jan. 5, 2007 (KR) .................. 10-2007-0001691

(51) Int. Cl.
*G06F 13/00* (2006.01)
(52) U.S. Cl. ....................... 710/110; 710/104
(58) Field of Classification Search .................. 710/104, 710/305, 110
See application file for complete search history.

(56) References Cited

U.S. PATENT DOCUMENTS

| | | | | |
|---|---|---|---|---|
| 5,262,919 A * | 11/1993 | Kuriyama et al. | ....... | 365/189.05 |
| 5,524,107 A * | 6/1996 | Duggan et al. | ......... | 370/504 |
| 5,608,896 A * | 3/1997 | Vogley | ........................ | 713/503 |
| 5,857,095 A * | 1/1999 | Jeddeloh et al. | ........... | 713/401 |
| 5,987,576 A | 11/1999 | Johnson et al. | | |
| 6,363,086 B1 * | 3/2002 | Lindqvist et al. | ........... | 370/527 |
| 6,505,281 B1 * | 1/2003 | Sherry | ...................... | 711/168 |
| 6,731,134 B1 * | 5/2004 | Bucossi et al. | ................ | 326/56 |
| 7,184,920 B2 * | 2/2007 | Sunden et al. | ............... | 702/125 |
| 7,225,286 B2 * | 5/2007 | Bennett | ...................... | 710/305 |

FOREIGN PATENT DOCUMENTS

| JP | 11-085667 A | 3/1999 |
|---|---|---|
| KR | 100242591 B1 | 11/1999 |
| KR | 100278284 B1 | 10/2000 |

\* cited by examiner

*Primary Examiner* — Khanh Dang
*Assistant Examiner* — Nimesh G Patel
(74) *Attorney, Agent, or Firm* — Volentine & Whitt, PLLC

(57) ABSTRACT

A semiconductor device for detecting and compensating for a propagation delay of a tri-state bidirectional bus connected between a master block and a plurality of slave blocks. The master block controls the slave blocks. A bidirectional bus connects the master block and each of the slave blocks and accommodates transmission of data therebetween. A unidirectional bus is connected between the master block and each of the slave blocks. The unidirectional bus accommodates the transmission of control signals generated in the master block to the slave blocks wherein the master block detects a propagation delay time between the master block and the slave blocks. The master block counts the number of clocks from a time when a selected slave block transmits an allocated symbol to a time when the allocated symbol reaches the master block such that a propagation delay time between the master block and the selected slave block is detected and stored.

13 Claims, 6 Drawing Sheets

US 8,015,336 B2

METHOD OF COMPENSATING FOR PROPAGATION DELAY OF TRI-STATE BIDIRECTIONAL BUS IN A SEMICONDUCTOR DEVICE

CROSS-REFERENCE TO RELATED PATENT APPLICATION

This application claims the benefit of Korean Patent Application No. 10-2007-0001691, filed on Jan. 5, 2007, in the Korean Intellectual Property Office, the disclosure of which is incorporated herein in its entirety by reference.

BACKGROUND OF THE INVENTION

1. Field of the Invention

Embodiments of the invention relate to a semiconductor device. More particularly, embodiments of the invention relate to a method of detecting the propagation delay of a tri-state bidirectional bus connected between blocks in a semiconductor chip to compensate for detected propagation delays.

2. Discussion of Related Art

As more semiconductor devices operate at high speeds, synchronization between the semiconductor chip and external devices as well as synchronization between signal lines and blocks within the chip is increasingly important. In addition, routing and cross-talk associated with the number of signal lines in these chips becomes an issue as more and more devices are formed on such chips. Signal lines are used to connect blocks in a semiconductor chip. Buffering and trees are generally used to reduce propagation delays between blocks or to skew generations. A method of minimizing signal skews is disclosed in U.S. Pat. No. 5,987,576.

FIG. 1 illustrates signal lines connected between blocks in a semiconductor device. In particular, signal lines LR1-LR4 connect master block 11 with slave blocks 12-15 and are used for reading. Signal lines LW1-LW4 also connect master block 11 with slave blocks 12-15 in a tree configuration and are used for writing. Buffers BR1-BR6 and BW1-BW8 are used to minimize propagation delay or skew associated with the signal lines. However, this method complicates chip layout and routing. Also, propagation delay or skew has a fixed time adapted to a clock period, but the clock period is adjustable. This method also limits the operating frequency and is less accommodating to changes in operating processes and environment.

When a tri-state bidirectional bus is used for connecting signal lines between blocks in a semiconductor device, these signal lines are commonly used for reading and writing. This use combination greatly reduces the number of signal lines. However, when using a tri-state bidirectional bus, signals cannot be amplified via buffering. Therefore, a tri-state bidirectional bus may be used between adjacent blocks, but propagation delays and increased transition times limit its use between distant blocks. In particular, when a unidirectional and a bidirectional bus are used together, synchronization becomes difficult between the corresponding signals.

SUMMARY OF THE INVENTION

Exemplary embodiments of the present invention are directed to a semiconductor device utilizing a tri-state bidirectional bus capable of synchronizing signals of a unidirectional bus and a bidirectional bus. In an exemplary embodiment, the semiconductor device includes a plurality of slave blocks, a master block, a bidirectional bus and a unidirectional bus. The master block controls the slave blocks. The bidirectional bus is connected between the master block and each of the slave blocks to transmit data there between. The unidirectional bus is connected between the master block and each of the slave blocks and accommodates the transmission of control signals generated in the master block to the slave blocks where the master block detects a propagation delay time between the master block and the slave blocks.

DETAILED DESCRIPTION OF THE INVENTION

Figure 1:
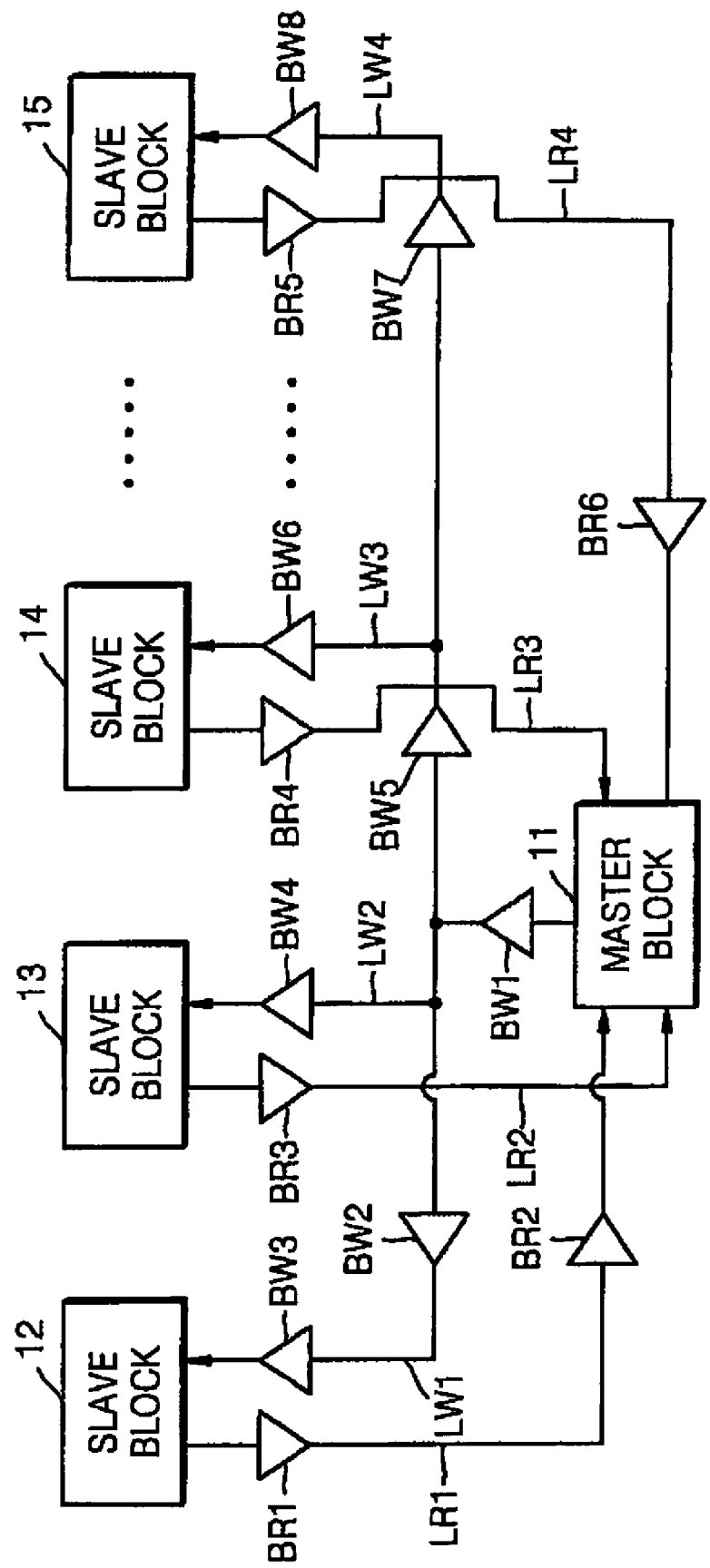
FIG. 1 is a view illustrating signal lines connected between blocks in a semiconductor device according to a related art.

The present invention will now be described more fully hereinafter with reference to the accompanying drawings, in which preferred embodiments of the invention are shown. This invention, however, may be embodied in many different forms and should not be construed as limited to the embodiments set forth herein. Rather, these embodiments are provided so that this disclosure will be thorough and complete, and will fully convey the scope of the invention to those skilled in the art. In the drawings, like numbers refer to like elements throughout.

Figure 2:
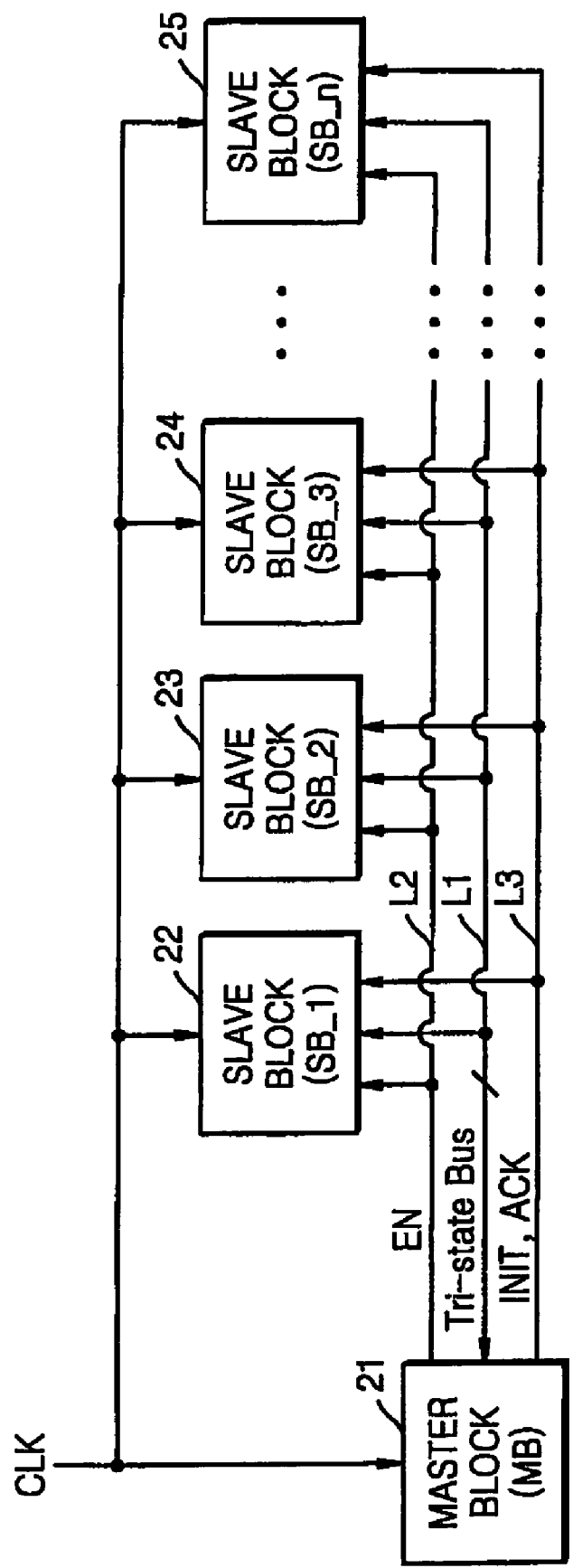
FIG. 2 is a schematic block diagram of a semiconductor device according to an embodiment of the present invention.

FIG. 2 is a schematic block diagram of a semiconductor device including a plurality of slave blocks 22-25, a master block 21 for controlling the slave blocks 22-25. The semiconductor device also includes tri-state bidirectional bus L1 connected between master block 21 and slave blocks 22-25, and unidirectional buses L2 and L3 connected between master block 21 and slave blocks 22-25. Slave blocks 22-25 and master block 21 are synchronized to operate with a clock signal CLK. In particular, master block 21 detects a propagation delay time of tri-state bidirectional bus L1 between the master block 21 and each of the slave blocks 22-25. Bidirectional bus L1 transmits data between master block 21 and slave blocks 22-25. In this manner, data of master block 21 is transmitted to slave blocks 22-25 via bidirectional bus L1, and data of slave blocks 22-25 is also transmitted to master block 21 via bidirectional bus L1. Unidirectional buses L2 and L3 transmit control signals, such as enable signal EN, initial signal INIT, and acknowledge signal ACK, generated from master block 21 to slave blocks 22-25. Initial signal INIT and acknowledge signal ACK are used for detecting a propagation delay time associated with tri-state bidirectional bus L1 between master block 21 and each of the slave blocks 22-25. Enable signal EN is used for enabling slave blocks 22-25.

Figure 3:
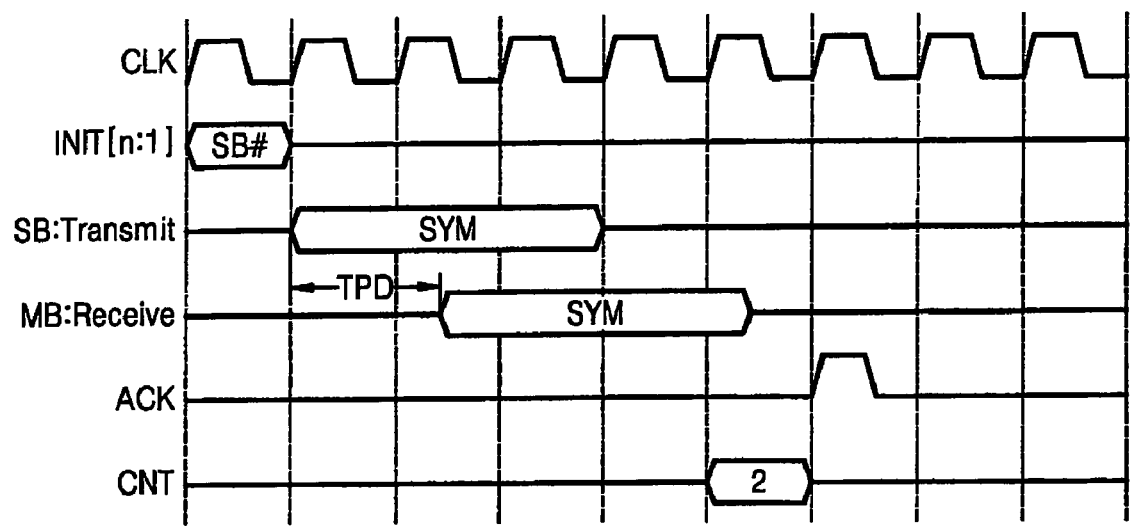
FIG. 3 is a timing diagram showing a method and operation of detecting a propagation delay time by a master block in the semiconductor device illustrated in FIG. 2 according to an embodiment of the present invention.

FIG. 3 is a timing diagram showing a method and operation of detecting a propagation delay time by a master block in the semiconductor device illustrated in FIG. 2 where SB represents the slave blocks and MB represents the master block. Master block 21 generates an initial signal INIT and transmits this signal to slave blocks 22-25 via unidirectional bus L3. One of the slave blocks 22-25 is selected based on initial signal INIT. When one of the slave blocks 22-25 is selected, the selected slave block SB transmits an allocated symbol SYM to master block 21 (MB) via bidirectional bus L1. Master block 21 counts the number of clock signals CLK from a time when the selected slave block SB transmits symbol SYM to a time when symbol SYM reaches master block MB so as to detect and store a propagation delay time between the master block MB and the selected slave block SB.

The detected propagation delay time is calculated as the number of clocks CLK and is represented as the minimum number of clocks which is greater than an actual propagation delay time. For example, the actual propagation delay time TPD is shown in FIG. 3 which is defined by the number of clocks CLK (about 1.5) from the time when slave block SB transmits signal SYM to a time when the symbol SYM reaches master block MB. A counter of master block MB counts the number of clocks as 2 which corresponds to the detected propagation delay time CNT. Next, master block MB recognizes received symbol SYM and generates acknowledge signal ACK transmitted to the selected slave block SB via unidirectional bus L3. The selected slave block SB maintains a hold state in response to acknowledge signal ACK. The propagation delay time between the master block MB and the selected slave block SB is detected and the detected propagation delay time CNT is stored in a register of master block MB.

Figure 4:
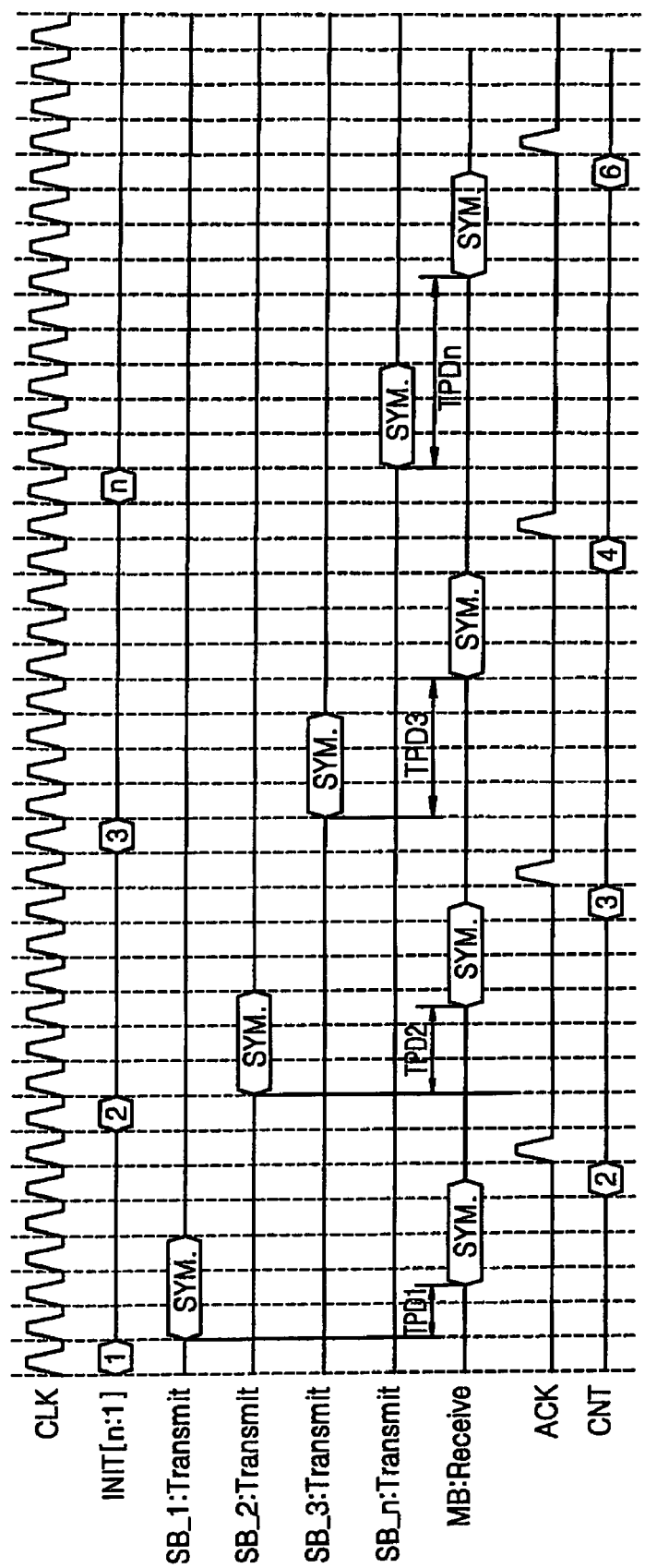
FIG. 4 is a timing diagram illustrating a method and an operation of detecting propagation delay times between a master block and all slave blocks in the semiconductor device illustrated in FIG. 2 according to an embodiment of the present invention.

FIG. 4 is a timing diagram showing a method and operation of detecting propagation delays between master block 21 and slave blocks 22-25. Slave block 22 (SB_1) illustrated in FIG. 2 is selected by an initial signal INIT[1] generated by master block 21 (MB). The number of clocks (CNT=2) corresponding to a propagation delay time TPD1 between master block MB and slave block SB 1 is counted. The number of clocks (CNT=2) is stored as a detected propagation delay time between master block MB and slave block SB_1 in the master block MB register. Slave block 23 (SB_2) is selected by an initial signal INIT[2] generated in master block MB. Then, the number of clocks (CNT=3) corresponding to a propagation delay time TPD2 between master block MB and slave block SB_2 is counted and the number of clocks is stored in the master block register as a detected propagation delay time between master block MB and slave block SB_2. Slave block 24 (SB_3) illustrated in FIG. 2 is selected by an initial signal INIT[3] generated in the master block MB. The number of clocks CNT=4 corresponding to a propagation delay time TPD3 between the master block MB and the slave block SB_3 is counted and stored as a detected propagation delay time in the register of the master block MB. Slave block 25 (SB_n) illustrated in FIG. 2 is selected by an initial signal INIT[n] generated in the master block MB. Then, the number of clocks CNT=6 corresponding to a propagation delay time TPDn between the master block MB and the slave block SB_n is counted and stored as a detected propagation delay time in the register of the master block MB.

Figure 5:
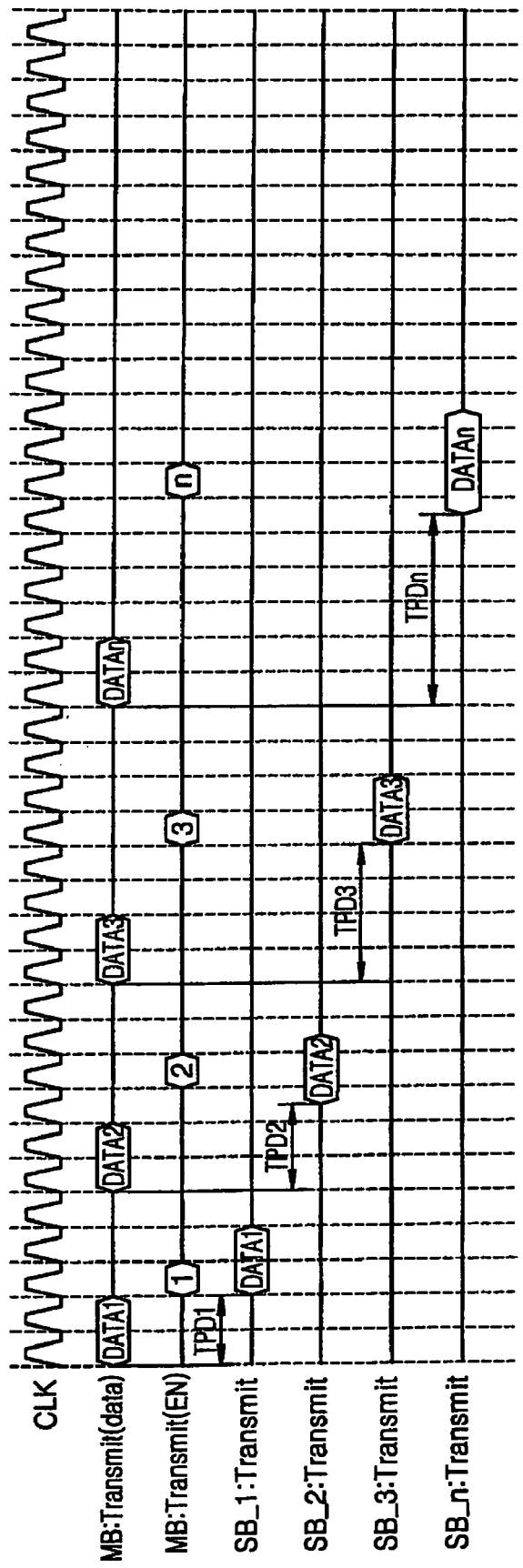
FIG. 5 is a timing diagram illustrating a method and an operation of compensating for propagation delay times detected in the semiconductor device illustrated in FIG. 2 according to an embodiment of the present invention.

FIG. 5 is a timing diagram illustrating a method and operation for compensating for the propagation delay time detected in the semiconductor device illustrated in FIG. 2. Master block 21 (MB) transmits data signal DATA1 to a first selected slave block 22 (SB_1) via bidirectional bus L1. Data signal DATA1 is delayed by the propagation delay time TPD1 between the master block MB and slave block SB_1 before reaching slave block SB_1. In order to compensate for the propagation delay time TPD1, master block MB generates an enable signal EN delayed by the detected number of clocks CNT=2 and stored in the register (from a time when the data signal DATA1 is transmitted). Enable signal EN is transmitted to the first selected slave block SB_1 via unidirectional bus L2. Here, it is presumed that there is little propagation delay time of unidirectional bus L2 and the use of a buffer can further decrease the propagation delay time of the unidirectional bus. In this manner, data signal DATA1 transmitted via bidirectional bus L1 may be synchronized with enable signal EN transmitted via unidirectional bus L2. Enable signal EN is approximately located at the center of data signal DATA1 reaching slave block SB_1. Accordingly, slave block SB_1 may latch the data signal DATA1 in response to enable signal EN in a stable manner.

Master block 21 (MB) transmits data DATA2 to the second selected slave block 23 (SB_2) via bidirectional bus L1. Data signal DATA2 is delayed by the propagation delay time TPD2 between the master block MB and slave block SB_2, before reaching slave block SB_2. In order to compensate for the propagation delay time TPD2, master block MB generates an enable signal EN delayed by the number of clocks CNT=3 detected and stored in the register. The enable signal EN is transmitted to the second selected slave block SB_2 via unidirectional bus L2. Data signal DATA2 transmitted via bidirectional bus L1 may be synchronized with enable signal EN transmitted via unidirectional bus L2. In this manner, enable signal EN is approximately located at the center of data DATA2 when reaching slave block SB_2. Accordingly, slave block SB_2 may latch data signal DATA2 in response to the enable signal EN in a stable manner.

Master block 21 (MB) transmits data signal DATA3 to the third selected slave block 24 (SB_3) via bidirectional bus L1. Data signal DATA3 is delayed by the propagation delay time TPD3 between master block MB and slave block SB_3 before reaching slave block SB_3. In order to compensate for the propagation delay time TPD3, master block MB generates enable signal EN delayed by the number of clocks CNT=4 detected and stored in the register. The enable signal EN is transmitted to the third selected slave block SB_3 via unidirectional bus L2. In this manner data DATA3 transmitted via bidirectional bus L1 may be synchronized with enable signal EN transmitted via unidirectional bus L2. The enable signal EN is approximately located at a center of data DATA3 when reaching slave block SB_3. Accordingly, slave block SB_2 may latch data signal DATA3 in response to enable signal EN in a stable manner. Master block 21 (MB) transmits data DATAn to the fourth selected slave block 25 (SB_n) via bidirectional bus L1. Data signal DATAn is delayed by the propagation delay time TPDn between master block MB and slave block SB_n before reaching slave block SB_n. In order to compensate for propagation delay time TPDn, master block MB generates enable signal EN delayed by the number of clocks CNT=6 detected and stored in the register. Enable signal EN is transmitted to the final selected slave block SB_n via unidirectional bus L2. In this manner, data DATAn transmitted via bidirectional bus L1 may be synchronized with enable signal EN transmitted via unidirectional bus L2. Enable signal EN is approximately located at the center of data DATAn when reaching slave block SB_n. Accordingly, slave block SB_n may latch data DATAn in response to enable signal EN in a stable manner.

Figure 6:
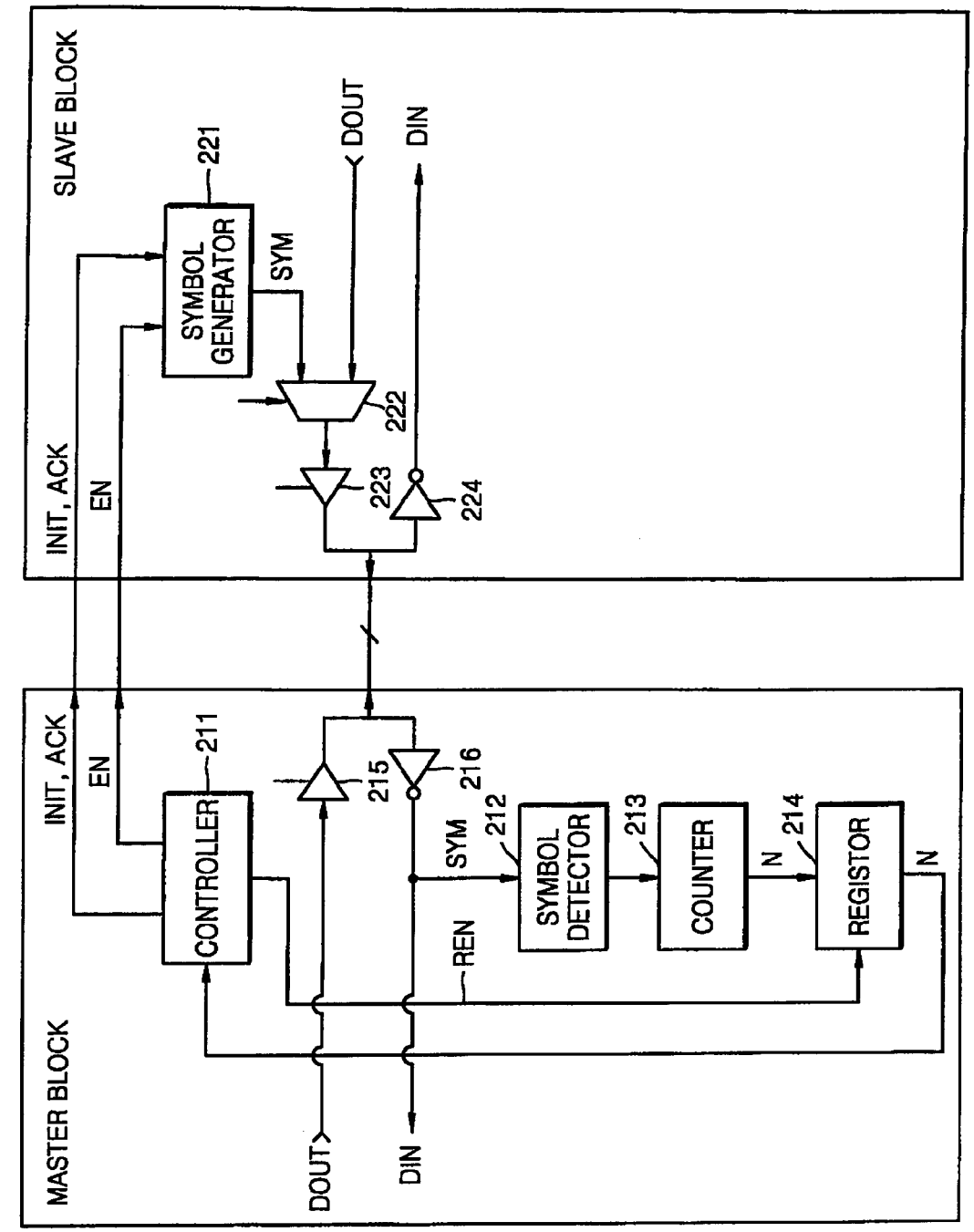
FIG. 6 is a block diagram illustrating a more detailed structure of the master block and the slave blocks illustrated in FIG. 2 according to an embodiment of the present invention.

FIG. 6 is a block diagram illustrating a more detailed structure of the master block and the slave blocks illustrated in FIG. 2. Master block MB includes controller 211, symbol detector 212, counter 213, register 214, output buffer 215, and input buffer 216. Controller 211 generates initial signal INIT, acknowledge signal ACK, and enable signal EN. Symbol detector 212 receives and detects symbol SYM transmitted via bidirectional bus L1 and input buffer 216. Counter 213 counts the number of clocks N from a time when the selected slave block SB transmits an allocated symbol SYM to the time when allocated symbol SYM reaches master block MB in response to an output of symbol detector 212. Register 214 stores the number of clocks N in response to a register enable signal REN generated by controller 211 and provides the stored number of clocks N to controller 211. Output buffer 215 receives data DOUT generated in master block MB to output the data DOUT to bidirectional bus L1. Input buffer 216 receives symbol SYM or data DIN transmitted from slave block SB via bidirectional bus L1. Slave block SB includes symbol generator 221, selector 222, output buffer 223, and input buffer 224.

Symbol generator 221 is controlled by initial signal INIT, acknowledge signal ACK, and enable signal EN. Symbol generator generates allocated symbol SYM in response to initial signal INIT. Selector 222 selects one of the symbol SYM and data DOUT generated in slave block SB. Output buffer 223 receives the output from selector 222 supplies it to bidirectional bus L1. Input buffer 224 receives data transmitted from the master block MB via bidirectional bus L1. In this manner, when unidirectional and bidirectional buses are used together, a signal of the unidirectional bus can easily be synchronized with a bidirectional bus signal.

Although the present invention has been described in connection with the embodiment of the present invention illustrated in the accompanying drawings, it is not limited thereto. It will be apparent to those skilled in the art that various substitutions, modifications and changes may be made thereto without departing from the scope and spirit of the invention.

What is claimed is:

1. A semiconductor device comprising:
    a plurality of slave blocks;
    a master block controlling the slave blocks;
    a bidirectional bus connected between the master block and each of the slave blocks to transmit data therebetween;
    a unidirectional bus connected between the master block and each of the slave blocks, said unidirectional bus accommodating the transmission of control signals generated in the master block to the slave blocks wherein the master block detects a propagation delay time between the master block and the slave blocks,
    wherein a selected slave block of the plurality of slave blocks transmits an allocated symbol to the master block via the bidirectional bus,
    the master block counts a number of clocks between a time when the selected slave block transmits the allocated symbol and a time when the allocated symbol reaches the master block, such that the propagation delay time between the master block and the selected slave block is detected, and
    stores the detected propagation delay time, and wherein the master block transmits data to the selected slave block via the bidirectional bus, and thereafter generates an enable signal and transmits the enable signal to the selected slave block via the unidirectional bus, wherein a delay time between transmission of the data and transmission of the enable signal is equivalent to the detected propagation delay time for the selected slave block.

2. The semiconductor device of claim 1 wherein the bidirectional bus is a tri-state bidirectional bus.

3. The semiconductor device of claim 1 wherein the master block is further configured to recognize the allocated symbol and transmit an acknowledge signal to the selected slave block.

4. The semiconductor device of claim 3 wherein the selected slave block is selected by an initial signal among the control signals generated in the master block and transmitted via the unidirectional bus.

5. The semiconductor device of claim 3 wherein the selected slave block is configured to maintain a hold state in response to the acknowledge signal.

6. The semiconductor device of claim 3 wherein the master block further comprises:
    a controller configured to generate the initial signal, the acknowledge signal, and the enable signal;
    a symbol detector configured to receive and detect an allocated symbol signal from the selected slave block;
    a counter communicating with the symbol detector and configured to count the number of clocks from the time when the selected slave block transmits the allocated symbol to the time when the allocated symbol reaches the master block in response to an output of the symbol detector; and
    a register communicating with the counter and configured to store the number of clocks and provide the stored number of clocks to the controller.

7. The semiconductor device of claim 6 wherein the master block further comprises:
    an output buffer configured to receive data generated in the master block and output the data to the bidirectional bus; and
    an input buffer configured to receive the allocated symbol or data transmitted from the selected slave block via the bidirectional bus.

8. The semiconductor device of claim 6 wherein the slave block further comprises:
    a symbol generator configured to generate the allocated symbol signal in response to the initial signal;
    a selector selecting one of the allocated symbol and the data generated in the slave block;
    a second output buffer configured to receive an output of the selector and provide the selector output to the bidirectional bus; and
    a second input buffer configured to receive data transmitted from the master block via the bidirectional bus.

9. The semiconductor device of claim 1 wherein the selected slave block latches the data in response to the enable signal.

10. A method of detecting a propagation delay of a tri-state bidirectional bus connected between a master block and a slave block in a semiconductor device, the method comprising:
    generating an initial signal using the master block;
    transmitting the initial signal to the slave block via a unidirectional bus;
    selecting the slave block using the initial signal transmitted via the unidirectional bus;
    generating an allocated symbol using the selected slave block;
    transmitting the allocated symbol to the master block via the bidirectional bus;

counting a number of clocks from a time when the selected slave block transmits the allocated symbol to a time when the allocated symbol reaches the master block;
detecting the counted number of clocks as the propagation delay for the tri-state bidirectional bus;
storing the counted number of clocks in the master block;
transmitting data to the selected slave block via the bidirectional bus;
generating an enable signal using the master block; and
transmitting the enable signal to the selected slave block via the unidirectional bus after said transmitting the data, wherein a delay time between transmission of the data and transmission of the enable signal is equivalent to the detected propagation delay time for the selected slave block.

11. The method of claim 10 further comprising:
generating an acknowledge signal using the master block;
transmitting the acknowledge signal to the selected slave block via the unidirectional bus; and
maintaining the slave block in a hold state responsive to the acknowledge signal transmitted via the unidirectional bus.

12. A method of detecting a propagation delay of a tri-state bidirectional bus connected between a master block and a slave block in a semiconductor device, the method comprising:
generating an initial signal using the master block;
transmitting the initial signal to the slave block via a unidirectional bus;
selecting the slave block using the initial signal transmitted through the unidirectional bus;
generating an allocated symbol using the selected slave block;
transmitting the allocated symbol to the master block via the bidirectional bus;
counting a number of clocks from a time when the selected slave block transmits the allocated symbol to a time when the allocated symbol reaches the master block;
storing the counted number of clocks in the master block;
detecting the stored number of clocks representing the propagation delay of the tri-state bidirectional bus;
transmitting data from the master block to the selected slave block via the directional bus;
generating an enable signal;
transmitting the enable signal to the selected slave block via the unidirectional bus after said generating the enable signal, wherein a delay time between said transmitting the data and said transmitting the enable signal is equivalent to the detected propagation delay time for the selected slave block; and
latching the data using the selected slave block in response to the enable signal.

13. The method of claim 12 further comprising:
generating an acknowledge signal in response to reception of said allocated symbol;
transmitting the acknowledge signal to the slave block via the unidirectional bus; and
maintaining the slave block in a hold state responsive to the acknowledge signal transmitted via the unidirectional bus.

\* \* \* \* \*